Dec. 1, 1964 H. E. SUTCH 3,159,198
METHOD OF AND APPARATUS FOR THE MANUFACTURE OF RAIL ANCHORS
Filed Aug. 10, 1961 7 Sheets-Sheet 1

INVENTOR.
HAROLD E. SUTCH
BY
ATTORNEY

Dec. 1, 1964 H. E. SUTCH 3,159,198
METHOD OF AND APPARATUS FOR THE MANUFACTURE OF RAIL ANCHORS
Filed Aug. 10, 1961 7 Sheets-Sheet 2

INVENTOR.
HAROLD E. SUTCH
BY
ATTORNEY

Dec. 1, 1964 H. E. SUTCH 3,159,198
METHOD OF AND APPARATUS FOR THE MANUFACTURE OF RAIL ANCHORS
Filed Aug. 10, 1961 7 Sheets-Sheet 4

INVENTOR.
HAROLD E. SUTCH
BY
ATTORNEY

Dec. 1, 1964　　　　　H. E. SUTCH　　　　3,159,198
METHOD OF AND APPARATUS FOR THE MANUFACTURE OF RAIL ANCHORS
Filed Aug. 10, 1961　　　　　　　　　　　　　7 Sheets-Sheet 5

FIG. 5

INVENTOR.
HAROLD E. SUTCH
BY
ATTORNEY

Dec. 1, 1964  H. E. SUTCH  3,159,198
METHOD OF AND APPARATUS FOR THE MANUFACTURE OF RAIL ANCHORS
Filed Aug. 10, 1961  7 Sheets-Sheet 6

INVENTOR.
HAROLD E. SUTCH
BY
ATTORNEY

United States Patent Office 3,159,198
Patented Dec. 1, 1964

3,159,198
METHOD OF AND APPARATUS FOR THE MANUFACTURE OF RAIL ANCHORS
Harold E. Sutch, Girard, Pa., assignor to True Temper Corporation, Cleveland, Ohio, a corporation of Ohio
Filed Aug. 10, 1961, Ser. No. 136,381
21 Claims. (Cl. 153—21)

This invention relates to an improved method of and apparatus for the manufacture of rail anchors, and relates more specifically to an improved method and apparatus for manufacturing channel-shaped rail anchors of the type disclosed and claimed in copending U.S. application S.N. 823,637, filed June 29, 1959, and now Patent No. 3,102,690.

The invention further relates to an improved method and apparatus for the manufacture of one piece rail anchors of the type referred to in a completely automatic, continuous die forging operation.

In certain prior art methods a series of forming dies were employed to perform the forming operation in a sequential manner, the blank at one stage or another being manually handled in order to properly orient the blank for a succeeding step.

It has also been common practice to preform the blank to a considerable degree before the die forming operation in order to simplify said operation. Thus, the blank fed to the die forming apparatus might be cross-sectioned in its final shape with only the bending being performed by the die forming apparatus.

With the above practices in mind, it is a primary object of this invention to form a one piece rail anchor by a continuous die-forging operation.

It is a further object of the invention to form a one piece rail anchor completely automatically.

A still further object of the invention is to provide improved apparatus for and an improved method of forming a one piece rail anchor from a flat blank of predetermined dimension.

A still further object of the invention is to perform the above mentioned continuous, automatic forming operation without requiring reheating of the blank during the operation.

Yet another object of the invention is to form a one piece rail anchor by providing apparatus wherein a high degree of accuracy is achieved in the forming operation, thus producing rail anchors of consistent, highly accurate dimensions.

Another object of the invention is to increase production and decrease costs by providing one piece rail anchors by a continuous and automatic operation.

These and other objects of the invention will become more apparent from the following specification and drawings, in which:

FIG. 3 is a perspective view of the rail anchor blank after the second forming operation at the second forming horn station;

Figure 7:
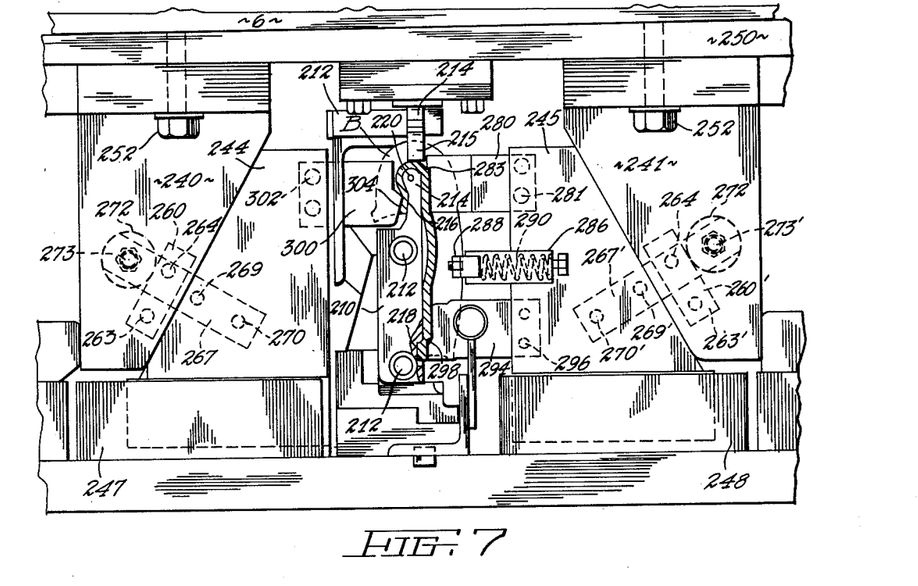
FIG. 7 is a rear elevational view showing the final forming horn and punch structure and mechanism for actuating the same.
Figure 7A:
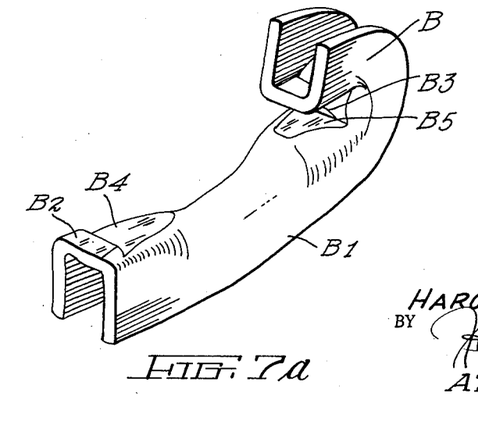
FIG. 7a is a perspective view of the complete rail anchor subsequent to the forming thereof on the final form horn.

In general, the rail anchor, shown in completed form in FIG. 7a, is formed in the following manner; flat steel blanks of very high temperature, e.g. 1850° F., are fed to magazines; the blanks are subsequently conveyed, one at a time, to a stamping station and subsequently to a first forming station where the blank is formed into a generally channel shape anchor having certain portions arcuately formed; the blank is then conveyed from the said first channel forming station to a second station and disposed upon a forming horn, at the said second station, the generally channel-shaped rail acnhor being there formed into a substantially J-shaped channel; the substantially J-shaped anchor form is then conveyed to a third or final station and onto a second forming horn by conveyor mechanism; at said final station, the J-shaped anchor form achieves its final shape having bearing pads, an anchor hook, overdrive preventing means, etc. formed therein; the completed rail anchor is removed from the final horn by a succeeding J-shaped rail anchor form, the completed rail anchor being caused by the movement of said succeeding anchor form to drop into a discharge chute for subsequent handling.

Figure 1:
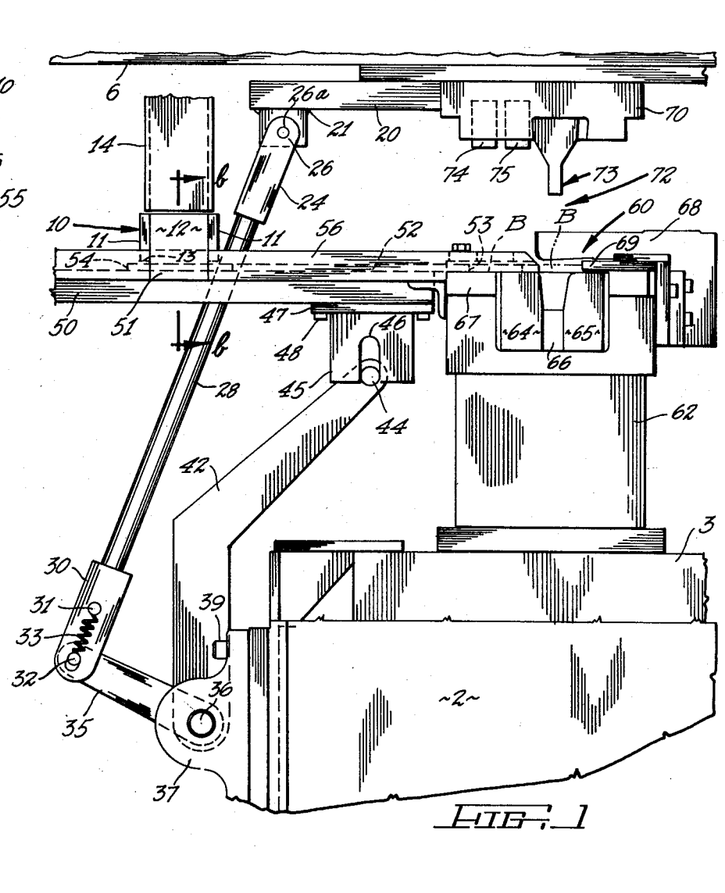
FIG. 1 is a side elevational view of a magazine and transfer mechanism for transferring rail anchor blanks from a magazine mounted adjacent said transfer mechanism and receiving said blanks from a dispensing station to a first forming station.
Figure 1A:
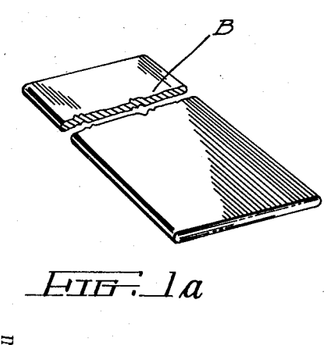
FIG. 1a is a perspective view of the preferred blank fed to the magazine.
Figure 1B:
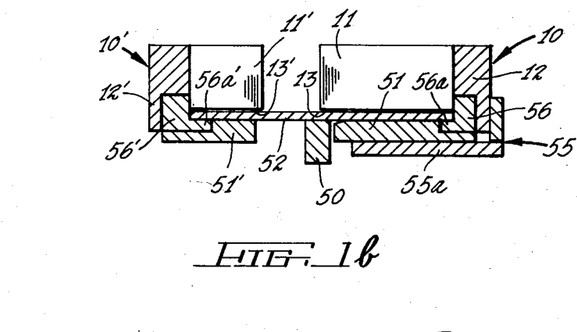
FIG. 1b is a sectional view taken on line 1b—1b of FIG. 1 and shows the transfer mechanism for transferring the rail anchor blanks to the first forming station.

Referring now to the drawings, in which all like parts are designated by like reference characters and referring more particularly to FIGS. 1 and 1b, wherein the structure for feeding the heated blanks to the apparatus and for transferring the blanks to the first forming station is illustrated, at 10 a fixed magazine is shown, which combines with an adjustable magazine 10', FIG. 1b, to receive heated blanks and to dispense the same. Each of said magazines in the form shown herein comprises a pair of side walls 11, 11' and end walls 12, 12', respectively, the side walls 11, 11' having bottom portions 13, 13' which terminate appreciably above the bottom of the end walls 12 and 12', the said magazines being disposed above a slideway or transfer mechanism leading to a stamping station and a first forming station. The blanks fed to the magazine 10 through a downwardly inclined chute 14 which is preferably rectangularly shaped, as shown in FIG. 1a, and the blanks are fed thereto at extremely high temperatures, as indicated above. Prior to the feeding of the said blanks into the fixed magazine 10 they are heated to the desired temperature, approximately 1850° F., by any suitable furnace or other heating means (not shown). Although it will be apparent that the invention is capable of being modified to accommodate blanks of varying sizes and forms, the blank illustrated in FIG. 1a is approximately ¼ to ⅜ inch in thickness, 3 inches wide, and 10½ inches long.

Referring now to the manner in which the heated rail anchor blanks are conveyed or transferred from the magazines 10 and 10' to the first forming station 72, the actuating mechanism for said transfer mechanism includes a ram bearing bar 20 integrally secured to a reciprocating ram 6 mounted in the upper portion of a die press, which, in a conventional manner, reciprocates to perform the desired die forming operations. The ram 6 further functions to actuate various transfer devices, as will be more particularly related hereinafter. The bar 20 is adapted to be reciprocated by the ram 6 and actuates by means of a plurality of levers 28, 35, and 42 and a pusher bar 50 which is integrally secured to a longitudinally extending pusher plate 52.

Referring to FIG. 1b, pusher plate 52 is adapted to be reciprocated in a slideway formed by a pair of L-shaped guide members 56, 56', which cooperate with the magazine to form a slideway on which successive anchors are deposited and in which the pusher plate moves to advance said successively deposited anchors. The guide members are preferably two in number, one member 56 being fixed and one member designated at 56' being movable to permit adjustment thereof wherefor various size rail anchors may be processed. Guide members 56 and 56' are generally L-shaped, positioned on either side of the pusher plate 52 and beneath the same, and are seated in openings in the end walls 12, 12', respectively, of the fixed magazine 10 and adjustable magazines 10'. The inturned end portions 56a and 56a' of the guide members 56 and 56', respectively, support the said pusher plate 52 and support the blank being transferred thereby to the first forming station. The guide members 56 and 56' are mounted on the frame of the press by mounting member (not shown), guide member 56 being fixedly mounted and guide member 56' being mounted for adjustment.

Support members 51 and 51' are secured to the bottom portions of the guide members 56 and 56' by bolt means (not shown). The support members 51 and 51' are approximately the same width as the magazines 10 and 10' and function to provide additional support for the rail anchor blanks positioned in the magazines, and further function to prevent the blanks from falling through the opening between the guide members. Support member 51 is fixed and forms part of the fixed magazine assembly and support 51', together with guide bar 56' and magazine 10', is adjustable to accommodate different size rail anchor blanks.

An L-shaped fixed magazine bottom support member 55 is secured to the back of the end wall 12 of the fixed magazine 10 by bolt means (not shown). The inturned end portion 55a of member 55 extends beneath the fixed support member 51 and supports the same in a fixed position.

Referring now to the manner in which the pusher plate 52 is reciprocated, the lever 28 is pivotally secured to the bar 20 through a U-shaped member 21 depending therefrom, a clevis 24 being adapted to be pivotably mounted thereon by means of pin means 26 which extend through aligned apertures 26a in said U-shaped member 21. The elongated angularly disposed actuating rod 28 is connected at its upper end to the clevis 24 and at its lower end to a magazine transfer actuating arm 42 by a clevis 30 and link 35, said clevis having a plurality of openings therethrough, into which pins 31 and 32 are projected. The pin 32 is disposed in an elongated opening in the clevis to provide a lost motion connection therewith, as will be described hereinbelow. A coil spring 33 is secured at its ends to the pins 31 and 32. The short arm or link 35 operatively connects the clevis 30 to arm 42 by pin means 32 and shaft means 36, and said shaft 36 is housed in a pillow block 37, on which the magazine transfer bar actuating arm 42 is pivotally mounted. The upper end of the arm 42 is provided with a cam follower 44 which rides in an open-ended arcuate slot 46 centrally positioned in a cam follower yoke 45 secured to the bottom surface of a magazine pusher bar 50.

It will thus be seen that when ram 6 is moved downwardly by press apparatus (not shown) in timed sequence, the bar 20, clevis 24, actuating rod 28, and clevis 30 will likewise move downwardly causing the relatively short transverse arm 35 to rotate downwardly, pivoting in the pillow block 37. The arms 35 and 42 are preferably integrally secured to the shaft 36 as by welding or the like. Hence, as the arm 35 moves downwardly, the shaft 36 will rotate counterclockwise, to correspondingly move the actuating arm 42 counterclockwise, or to the left, as shown in FIG. 1. Thus it will be seen that cam follower yoke 45 will likewise be moved to the left, as viewed in FIG. 1, by the cam follower 44, and since the magazine pusher bar 50 is preferably connected to the cam follower yoke 45 by means of bolts 48, which extend through openings in a flange 47 of the cam follower yoke 45, the pusher plate 52 having a front end portion 53 and a rear end portion 54 and of sufficient width to engage a major portion of the length of the blank "B," the plate moves rearwardly to the left, as viewed in FIG. 1, and assumes a position where the end 53 is disposed outwardly of the magazine to initiate a blank moving sequence.

Upon upward movement of reciprocating ram 6, in a manner to be described hereinafter, the actuating lever 28 moves upwardly due to the above described connection with the reciprocating ram 6 and the arm 42 functions to move the cam follower yoke 45 forwardly or to the right, as viewed in FIG. 1, to the position as shown in dotted lines in FIG. 1 where the blank is deposited on a pair of aligned die part members 64 at a first forming station 72 and immediately below stamping members 74, 75. The spring 33 and elongated slot in the clevis 30 provides a means to permit slight overtravel whereby stresses in the transfer mechanism are absorbed.

As noted above, the sidewalls 11, 11' of the magazines 10 and 10' have bottom portions 13, 13' which terminate above the bottom of the end wall 12 and the opening thus formed by the termination of sidewalls 11 and the positioning of the pusher plate 52 with respect thereto permits the plate 52 to freely move through said magazine, as illustrated in FIG. 1. Thus it will be seen that when the magazine pusher bar 50 is retracted in a manner explained above, the pusher plate 52 will likewise be retracted, assuming a position wherein the front end portion 53 of plate 52 is behind the magazines 10 and 10', permitting the lowermost blank in the magazines 10, 10' to drop to a position on the guide members 56, 56' and the support members 51 and 51' disposed immediately below the magazine whereby the said blank may be transferred by contact with the front end portion 53 of the plate 52 during the next succeeding transfer cycle.

It will be noted in FIG. 1 that the lowermost blank, subsequently transferred by the pusher plate 52, is not transferred immediately to a position immediately below the first form die punch 73 but rather it is preferred, as shown, that there be at all times a pair of blanks adjacent the first form, one blank being positioned immediately below the first form die punch, and the other blank being positioned in alignment with and immediately rearwardly of the first blank or to the left thereof, as viewed in FIG. 1. Thus, when a succeeding blank is transferred by the pusher plate 52, the previously rearwardly positioned blank will be transferred to a position immediately below the first form die punch 73 by contact of the succeeding blank, and rests upon die side members 63 and 65, the blank previously positioned thereunder having been transferred from the first form station to the succeeding form station.

Figure 2:
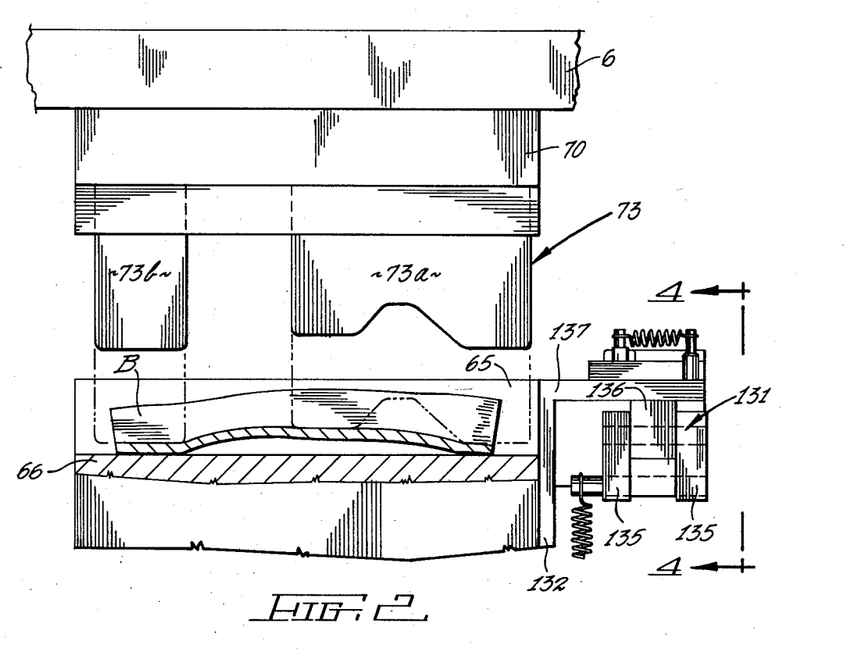
FIG. 2 is a front elevational view, partly in section, showing the first forming station, with the blank being shown in solid lines in its formed shape, the forming dies being shown in elevated position, in solid lines and in blank forming position in dotted lines.

Referring now to FIGS. 1 and 2, the first forming station comprises a first form die punch holder 70, which is integrally secured to the reciprocating ram 6 and reciprocates therewith. The pair of stamping holders 74 and 75, referred to hereinbefore, are securely mounted in the punch holder 70, the holders 74 and 75 functioning to hold desired stampings or indicia (not shown). It is obvious that this is a desired but non-essential part of the rail anchor forming mechanism of this invention. The first form punch 73, as shown, is secured to the punch holder 70 which depends from and is secured to the ram means 6 and comprises a pair of aligned and spaced depending punch members 73a and 73b, the punch member 73b being generally rectangular in form having a generally flat bottom surface adapted to contact the hook end of the anchor and the punch 73a being of substantially greater length and having an irregular or notched central portion and a pair of spaced flat channel-forming surfaces.

As best illustrated in FIG. 1, a bottom die holder 62 is securely mounted on the base 2 and bolster plate 3 of the press whereby a bottom die is firmly held in place thereon. The bottom die comprises a stamping block die bottom 67, first form die sides 64 and 65 and a first die bottom 66. The die sides 64 and 65 combine with the die bottom 66 to define a generally U-shaped die opening for the reception of a rail anchor blank fed thereto and deformed therein by said first form punch 73 during the simultaneous downward movement of the punch members 73a and 73b thereof. A pattern stop member 69 is positioned above the rearwardly disposed die side 65 and serves to limit the movement of a blank positioned immediately below the first form punch 73 by the plate 52. A substantially L-shaped stripping member 68 is secured to the side of the die assembly and has its free end disposed over the bottom die at a position between the die punch members 73a and 73b whereby the same is adapted to function in a conventional manner to prevent the upward movement of the blank subsequent to the forming thereof at the first forming station.

Figure 2A:
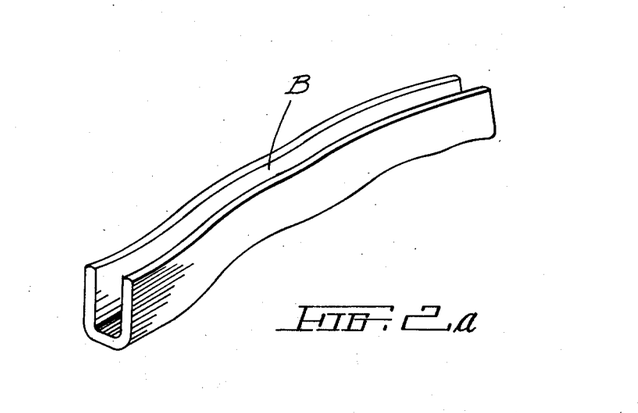
FIG. 2a is a perspective view of the rail anchor blank after the forming thereof at the first forming station shown in FIG. 2.

It will thus be seen that when the first form die punch 73 is moved downwardly, punches 73a and 73b will contact the upper portion of blank "B", thereby forming the blank "B" into a substantial channel type configuration, shown more clearly in FIG. 2a. Noting FIG. 2, the bottom surfaces of portions 73a and 73b of the first form punch 73 form a discontinuous line, whereby as the first form punch 73 moves downwardly into the dotted line position of FIG. 2, the blank B is generally bowed in the central portion thereof.

As punch holder 70 moves downwardly, it will be seen that stamping members secured to stamping holders 74 and 75 will function to stamp appropriate information on the blank succeeding the blank being formed by the first form die punch 73. Thus, during one cycle a blank B does through the stamping operation, and in the next cycle the blank is formed into a channel-shaped bowed form anchor by the downward movement of punch 73.

When the first form punch 73 moves downwardly due to actuation of the reciprocating ram 6, the transfer pusher plate 52 is simultaneously moved rearwardly and upon upward movement of the first form punch 73 subsequent to the forming operation of a first blank, a succeeding blank is transferred from the magazine in a direction toward the first forming station and into a position below the stamping station and moves the blank previously positioned thereunder into a position immediately below the first form die punch 73.

It will be apparent to those skilled in the art that if the stamping operation be eliminated, appropriate changes could be made in the transfer mechanism to transfer the blank directly from the magazine to a position below the first form punch 73.

Figure 3:
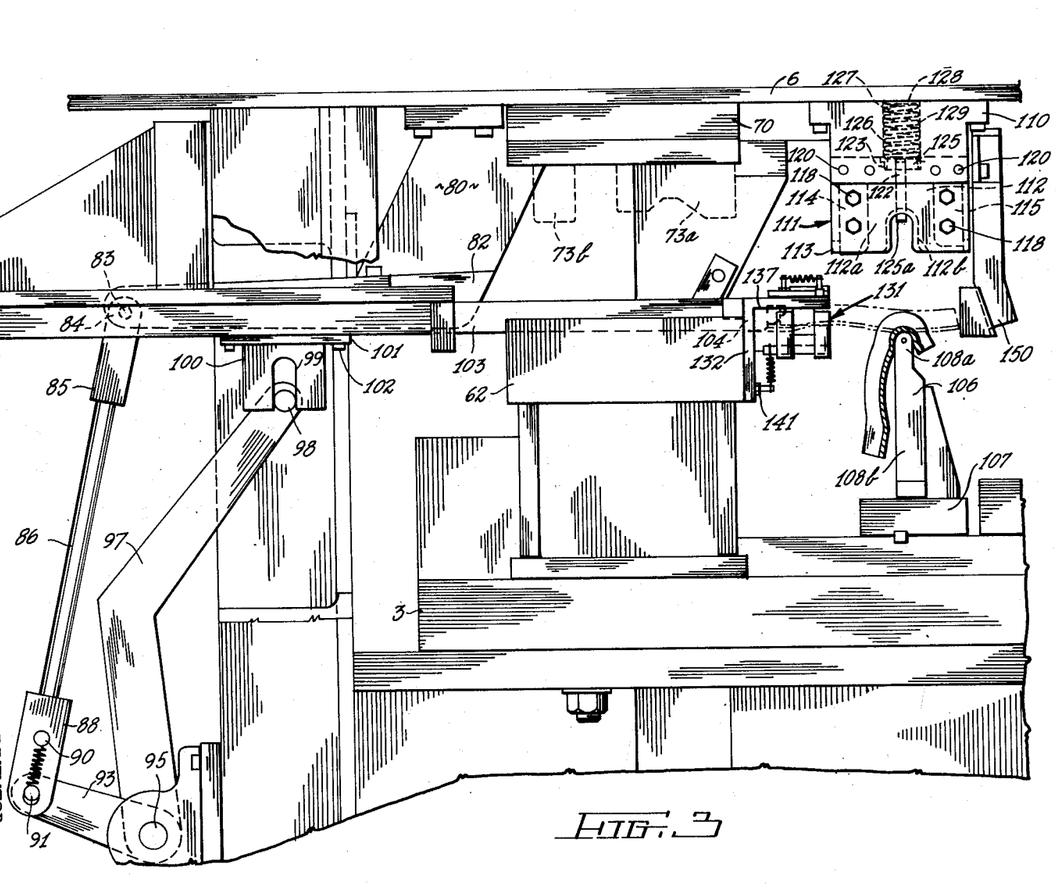
FIG. 3 is a front elevational view showing the first forming station, the second forming station, and transfer mechanism for transferring the rail anchor blank from the first forming station to the second forming station.
Figure 4:
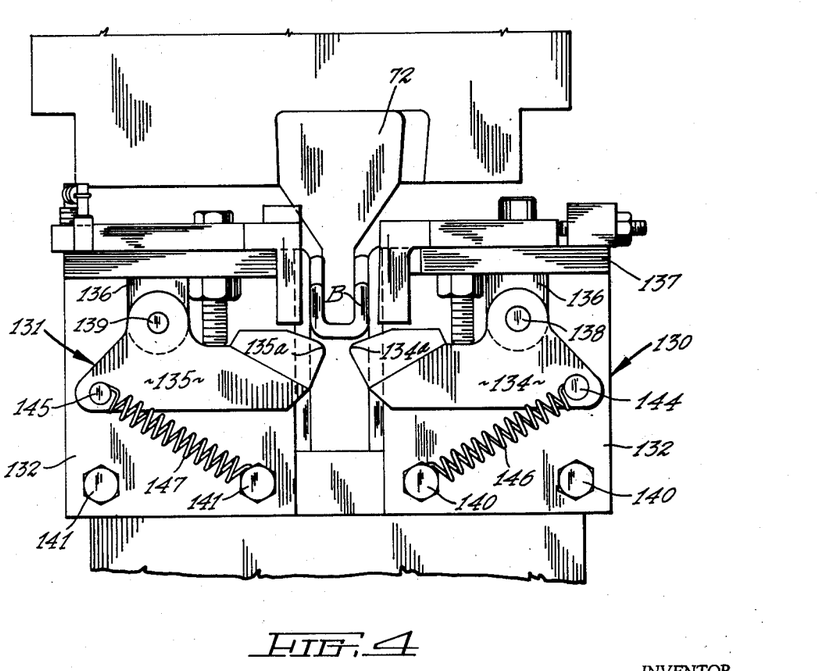
FIG. 4 is a side elevational view taken on line 4—4 of FIG. 2 showing mechanism for releasably supporting the rail anchor blank during the transfer thereof from the first forming station to the second forming horn.

FIGS. 3 and 4 illustrate the manner in which the rail anchor blank, formed in channel shape at the first forming station, is conveyed or transferred from the said first forming station to a second forming station. FIG. 3 further shows the second forming station structure. Referring now to FIG. 3, the means for transferring the blanks from the first forming station to the second forming station comprises linkage mechanism, similar to that shown in FIG. 1, for communicating reciprocating movement from the ram 6 to a push bar 103 to advance a blank formed at the first station. The mechanism comprises an angled ram arm 80 fixedly mounted on the reciprocating ram 6, the bottom portion of said ram arm 80 being integrally secured to a transversely extending arm portion 82 to form a generally L-shaped ram arm, the arm portion 82 having an opening 83 in the free end thereof, a clevis 85 being operatively connected to the said arm 82 by pin means 84 through said opening 83. An elongated actuating rod 86, similar to the rod 28, is rigidly secured at its upper end to the lower portion of the shear clevis 85 and is connected to actuating arm 97 through clevis 88, a short link 93, and shaft 95, whereby motion is transferred from rod 86 to actuating arm 97. Referring to the specific motion transferring means, the lowermost clevis 88 has associated therewith a pair of pins 90 and 91, the latter being mounted for lost motion. The link or arm 93 is pivotally mounted on the pin 91, and is integrally connected at its other end to the shaft 95, mounted on a pillow block, and said shaft 95 is in turn integrally secured to the arm 97, similarly to the connections 35, 36, and 42 in FIG. 1, whereby movement of the arm 93 will correspondingly move the arm 97.

The means whereby the movement of actuating arm 97 is translated to operate the transfer push bar 103 comprises a cam follower 98 mounted on the upper end of arm 97 and adapted to ride in a slot 99 in a cam follower yoke 100. The cam follower yoke 100 is connected to push bar 103 through a flange 101 which has apertures through which bolt means 102 extend upwardly into threaded engagement with threaded openings in the bottom surface of push bar 103. The transfer push bar 103 is preferably relatively narrow to enable said bar to reciprocate in the U-shaped opening defined by the die sides 64 and 65 and the die bottom 66, whereby the push bar 103 transfers the channel-shaped rail anchor blank B to the second form horn.

The bar 103 has securely mounted on the free end thereof a transfer push bar foot 104. The foot 104 preferably has a relatively thin layer of high temperature resistant alloy such as Stellite provided on the surfaces thereof which contact the high temperature channel-shaped blank, thereby significantly prolonging the life of the transfer push bar 103 and reducing costly maintenance on the press.

It will be seen that when the ram 6 is moved downwardly the ram arm 80, arm 82, and the actuating rod 86 will likewise be moved vertically downward, rotating the arm 97 counterclockwise, moving the cam follower yoke 100 and transfer push bar 103 to the left, as shown in FIG. 3 and when the ram 6 is in its most downward position, the transfer push bar foot 104 is withdrawn to a position with respect to the punch 73b, wherein the transfer push bar 103 is clear of interference with the first forming step. When the ram 6 is moved vertically upwardly, the transfer push bar 103 will correspondingly be moved in an opposite direction, or to the right, as shown in FIG. 3, by means of the above described linkage assembly, and the transfer push bar foot 104 is caused to engage the rail anchor blank formed at the first station, as shown in FIG. 2a, transferring the same to the second form horn.

During the transfer of the blank to the second form horn, the blank is supported by means of pivotable shelf assemblies 130 and 131, illustrated in FIGS. 2–4, mounted on the side of the die holder 62, said assemblies being provided with downwardly extending flanges 132 secured to the die holder 62 by suitable securing means such as, e.g. bolts 140 and 141. The pivotable shelf assemblies 130 and 131 provide a releasable support means for the transferring of the channel-shaped rail anchor blank of FIG. 2a, the support being releasable to facilitate the downward movement of the second form punch 111.

Referring now particularly to FIG. 4, the shelf assemblies 130 and 131 comprise a pair of spaced shelf members 134 and 135 which are supported for pivotable movement about shafts 138 and 139 respectively, said shafts being mounted in brackets 136, 136 depending from the horizontally extending plate members 137, 137 of the flanges 132. The shelf members 134 and 135 are resiliently biased in blank-supporting position, as shown in FIG. 4, by means of coil springs 146 and 147, respectively, connected to said shelf members at an outer corner thereof by bolt means 144 and 145, respectively, and to each flange 132 at an inwardly disposed edge thereof by pin means 140 and 141 respectively. The said shelf members 134, 135 are each provided on their confronting inner surfaces with a pair of integrally formed toe plates 134a and 135a respectively. It will thus be seen that the toe plates 134a and 135a of the shelf members 134 and 135, respectively, provide in combination a spaced, releasable support means for the channel-shaped rail anchor blank B during the movement thereof from the first forming station to the second forming horn 106.

Referring momentarily to FIG. 3, the channel-shaped rail anchor blank B is shown in a dotted line position immediately after the transfer thereof from the first forming station to a position overlying the second form horn, prior to the downward movement of the second form punch 111. In this position, the channel-shaped blank is shown as having a portion extending beyond the second form horn 106 and a portion disposed over the shelf mechanism. The blank B is held in this position by a pattern stop member 150 mounted on the press laterally thereof and to the right as viewed in FIG. 3, and the blank is thus supported by the top surface of the second form horn 106, and the toe plates 134a and 135a of the shelf members 134 and 135, respectively. As the second form punch 111 moves downwardly into engagement with the bottom or web of the channel portion of the channel-shaped blank B, disposed over the horn 106, the shelf members 134 and 135 pivot downwardly against the bias of the springs 146 and 147 and the channel-shaped blank supported thereby is released by the shelf members and is then supported solely by the second form horn 106, and caused by the downward movement of the punch 111 to assume the FIG. 3 solid line shape at the completion of the downward stroke of the said second form punch 111. As said punch 111 moves upwardly after completion of its forming cycle, the shelf members 134 and 135 assume their normal FIG. 4 position due to the action of the spring means 146 and 147, whereby the shelf assemblies are ready to support a subsequently transferred channel-shaped rail anchor blank.

Referring now in FIG. 3 to the second form punch assembly 111, the assembly comprises a form punch 112 substantially T-shaped in transverse cross-section and substantially U-shaped in longitudinal cross-section, the downwardly extending stem portion 112a thereof being provided with a centrally disposed arcuate notch 112b having positioned on either longitudinal side thereof a pair of punch cheek blocks 113 similarly formed in longitudinal cross-section. A pair of spacer elements 114 and 115 are interposed between the cheek blocks 113 and the stem portion of the form punch 112 to provide an anchor blank receiving space therebetween. Bolt means 118 holds the entire punch assembly together, comprising the pair of cheek blocks 113, the form punch 112, and the spacer elements 114 and 115. The upper portion of the generally T-shaped forming punch 112 is secured to the second form punch holder 110 by suitable securing means such as bolts 120.

The form punch 112 is provided with a bore 122 and a counter bore 123 through the longitudinal and transverse center thereof. Positioned in said bore and counter bore is a T-shaped resiliently mounted stripper means 125. The stripper means 125 has an upper surface 126 adapted to seat coil spring means 127, disposed within a bore 129 in the punch holder 110, said means seating further on a wear plate 128 disposed within the bore. The spring means 127 normally holds the stripper means 125 in its extended, downward position, as shown in FIG. 3. When, however, the second form punch assembly 111 moves downwardly during the forming cycle, the stem 125a of the stripper 125 will contact the bottom of the channel of the rail anchor blank. Upon continued downward movement of the second form punch assembly 111, the stripper 125 will be forced upwardly, against the bias of the spring 127, compressing the latter.

After the completion of the forming step, wherein the channel-shaped rail anchor assumes its FIG. 3, solid line configuration, the second form punch assembly 111 will move upwardly with the vertical upward movement of the ram 6. As the second form punch assembly 111 moves upwardly, eliminating the pressure on the stem 125a of stripper 125, the spring means 127 will resiliently urge stripper 125 downwardly, thereby stripping the substantially J-shaped rail anchor blank from the second form punch 112.

During the downward movement of the second form punch assembly 111, only the spacing elements 114 and 115 engage the channel-shaped rail anchor blank, the spacer elements being of such width as to be receivable within the channel of the blank, the bottom surfaces of the spacer elements 114 and 115 being provided preferably with a thin layer of Stellite so as to increase the resistance thereof to the relatively high temperatures of the rail anchor blank. During the downward movement of the second form punch assembly, the upwardly extending wall portions of the channel-shaped rail anchor, which are positioned upon form horn 106, extend into the space provided by the spacer elements 114 and 115 between the cheek blocks 113, 113 and the second form punch 112. It will be apparent that the second form horn 106 and that portion of the blank positioned immediately thereover will extend into the arcuate notches 112b formed in the punch 112 and cheek plates 113, 113 and said notches act as a guide therefor.

The second form horn 106 is vertically mounted on a base 107 mounted on bolster plate 3. It includes a rounded top portion 108a around which the rail anchor blank B is bent during the downward movement of the second form punch assembly and a main body portion 108b.

Figure 3A:
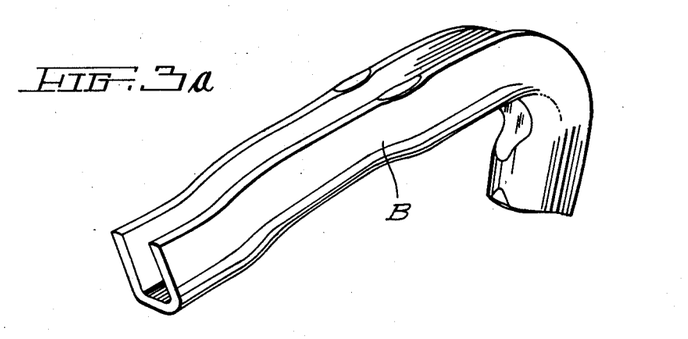

FIGURE 3a is an enlarged perspective view of the rail anchor blank of substantially J-shape formed by the second form horn and punch assembly.

Figure 5:
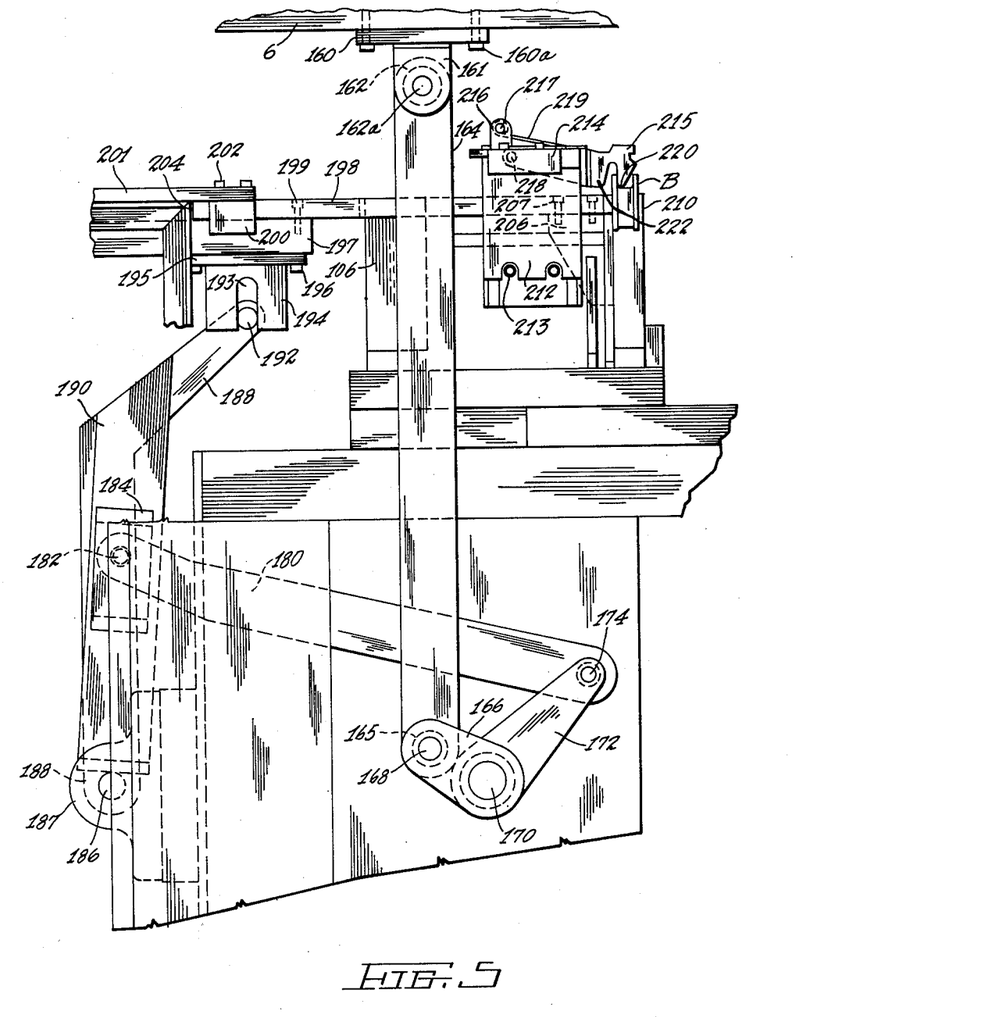
FIG. 5 is a side elevational view of the improved apparatus of this invention showing the second station forming horn, a third or final station forming horn, and transfer mechanism for transferring the partially completed rail anchor from the second forming horn station to the third or final forming horn station.

Subsequent to the forming of the rail anchor blank at the second forming station, the same is transferred to the third or final forming station. The transfer mechanism for accomplishing such transfer is shown in FIG. 5 and, in general, includes structure to translate movement of the reciprocating ram 6 into transverse reciprocating motion of a transfer push bar. Specifically, the transfer mechanism comprises a pivot mount 160 fixedly secured to the bottom of the reciprocating ram 6 by means such as, e.g. bolts 160a. Pivot mount 160 has a pair of parallel, downwardly depending brackets 161, said parallel brackets being spaced to receive therebetween an upwardly extending tongue portion 162 of an elongated link member 164. Flanges 161 and tongue portion 162 are provided with aligned apertures for the reception of a pin 162a extending therethrough whereby the link 164 is adapted to be secured to and reciprocated by the reciprocating ram 6.

The link 164 preferably comprises a thin flat bar which extends downwardly from the brackets 161 and terminate in an apertured tongue portion 165, which portion extends between a pair of spaced arms 166 which are pivotably mounted around shaft 168.

The spaced arms 166 are secured to shaft 170 as, e.g. by welding, whereby downward movement of arms 166 will cause shaft 170 to be rotated counterclockwise. Shaft 170 has further secured thereto a pair of spaced arms 172, which are secured to pin means 174 also serving as mounting means for a link member 180 disposed between the arms 172.

It will thus be seen that when reciprocating ram 6 is moved vertically downward, arm 174 will move downward whereby arm 180 is caused to move transversely, or to the left, as shown in FIG. 5.

Referring now to the manner in which movement is translated from arm 180 to push mechanism adapted to transfer blanks from the second form horn to the third or final form horn, the arm 180 is connected to a link bracket 184 by means of a pin 182, the link bracket 184 and the arm 180 being provided with aligned openings for the reception therefor. The link bracket 184 is integrally connected to an arm 190 by suitable means such as, e.g. bolts (not shown). The arm 190 is integrally connected to crank arm 188 and shaft 186 and said arm serves to reinforce the said link, the arm 190 and arm 188 moving together, the shaft 186 being mounted in pillow block 187. It will thus be seen that as the arm 180 moves to the left, as viewed in FIG. 5, in response to the downward movement of reciprocating ram 6 communicated to lever arm 164 pivotally connected thereto, the crank arm 188 will likewise move to the left, as viewed in FIG. 5.

The movement of arm 188 is transferred to push bar 197 by means of a cam follower 192 which projects outwardly from the arm 188, which rides in slot 193 formed in a cam follower yoke 194. The cam follower yoke 194 is fixedly secured to the push bar 197 by means of bolts 196 which extend through openings in a flange member 195 of said cam follower yoke 194.

A push bar fork 198 is securely attached to the push bar 197 by means of bolts 199. The push bar fork 198 is adapted to be reciprocated and guided within spaced bearing members 200, which are secured to the press by bearing mounting means 201 by means of bolts 202.

The push bar fork 198 is provided at its front end portion with a push bar fork foot 206 connected to the push bar fork 198 by means of bolts 207. The fork foot 206 functions to provide additional bearing surface for contact with the rail anchor blank during the transferral thereof from the second form horn to the final or third form horn. The front surfaces of push bar fork foot 206 and the end 204 of push bar fork 198 are preferably provided with Stellite, for the purpose described above.

Positioned between the second form horn 106 and the final form horn 210 is the transfer horn 198 which carries at opposite ends thereof the second form horn and the final form horn respectively. The contour of the transfer horn 198 is similar to that of the second form horn. Preferably, however, the transfer horn is of slightly less cross-sectional area than the preceding and succeeding form horns carried thereby to assist in easy transfer of anchors from and to the said form horns and to resist any tendency of the anchor blanks to bind while transferring the same thereover.

Figure 6:
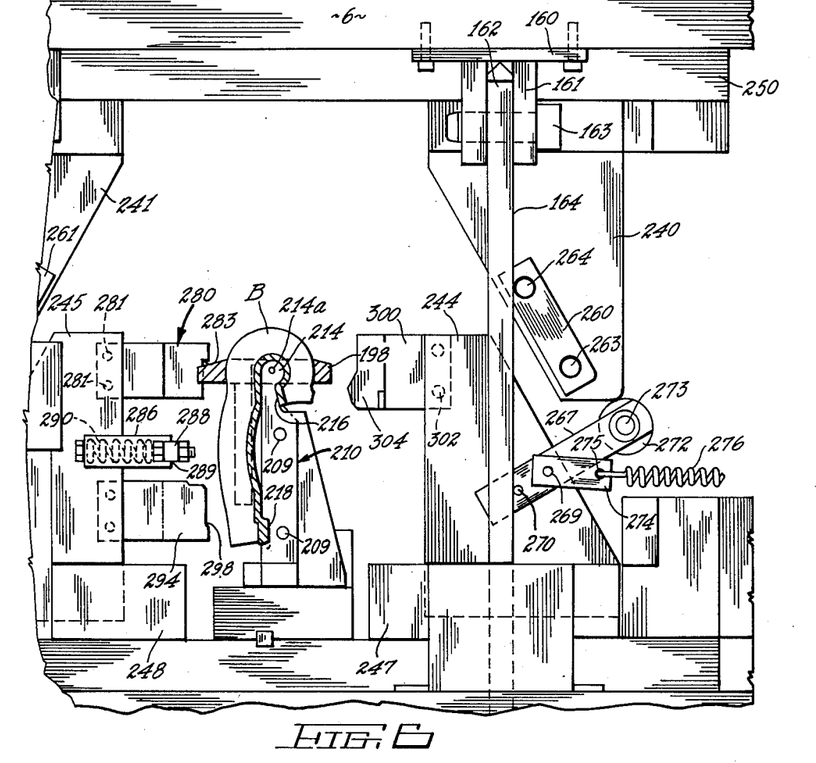
FIG. 6 is a front elevational view of the invention of the preceding figures, partly in section, showing more specifically the final forming horn and punch structure.

The push bar fork 198, noting momentarily FIG. 6, is of such a width that the upper or loop portions of the now generally J-shaped rail anchor blank can be engaged and transferred thereby to the final form horn 210. It will be noted that the push bar fork 198 reciprocates in the same plane as the uppermost portion of the second form horn 106 and the third horn 210 and therefore the push bar fork 198 is provided with a slot longitudinally disposed therein of sufficient length so that the top portion of the second form horn 106 and the third horn 210 may extend into said slot during the entire forward motion of the push bar fork 198.

Subsequent to the transferral of the blank to a position on the final form horn 210 at the third forming station, means are provided for maintaining said blank on said horn during the forming operation at said third station. The means for maintaining the blank on the final form comprises, referring to FIG. 5, an upper stop bearing mount 212 which is securely mounted to the transfer horn 208 by means, such as, e.g. bolt means 213. The upper stop bearing mount 212 is secured to one side of the transfer horn so as to not interfere with the transverse reciprocation of push bar fork 198.

Fixedly mounted on the upper portion of the upper stop bearing mount 212 is an upper stop bearing member 214 which is secured to the bearing mount 212 by bolt means (not shown). Extending upwardly from the top of the upper stop bearing 214 are a pair of ears 216, said ears having openings therein in the upper portion thereof for the reception of pin means 217. An upper rail anchor stop member 215 is pivotally mounted in the upper stop bearing 214 by pin means 218 which extend through aligned openings in the sides of the bearing member 214. A leaf spring 219 has one end thereof coiled around the pin means 217 and the other end thereof engaged with the upper surface of upper stop member 215, whereby the stop member 215 is biased downwardly into the position shown in FIG. 5. In this position the rail anchor blank B is firmly held on the final form horn 210 by engagement of detent portion 220 of upper stop member 215 with the bottom of the channel of that portion of the rail anchor blank B disposed over the curved portion of the final horn member.

The said upper stop member 215 has a downwardly projecting central portion 222, which engages the next succeeding rail anchor blank in a manner to be described more specifically below.

The downward movement of the reciprocating ram 6 functions through the above described linkage assembly to withdraw the push bar fork 198 to the left, looking in the FIG. 5 direction. The push bar fork 198 will be withdrawn to a position whereat the front end thereof will be positioned to the left of the second form horn 106. When the push bar fork 198 is in this withdrawn position, the second form horn 106 can freely receive a succeeding rail anchor blank thereover, said succeeding blank being deformed over said second form horn by the second form punch 111. As the reciprocating ram, upon the completion of the downward movement thereof, moves upwardly, the push bar fork 198 will move to the right, as viewed in FIG. 5, engaging the rail anchor blank positioned over the second form horn. As the front surface 205 of the push bar 198 and the front surface of the push bar fork 206 engage the rail anchor blank and transfer it to the right, the front surface of said blank will engage said downwardly projecting central portion 222 of said upper stop member 215, and will pivot the same upwardly about pivot pin 218. As the upper stop member 215 pivots upwardly, detent 220 will ascend to a point above the uppermost flange of the rail anchor blank B, positioned freely over the final form horn 210. Upon the continued forward motion of push bar fork 198, the next succeeding rail anchor blank contacts the rail anchor blank freely suspended on the final form horn 210 and forces the same therefrom; the removed rail anchor, in completed form, falling by gravity into a discharge chute 320 in a manner to be more fully explained hereinbelow.

As the succeeding rail anchor is moved to the right by the push bar fork 198, the rear flange of the blank clears the downwardly projecting central portion 222 of the stop 215 whereby the leaf spring 219 functions to bias the upper stop 215 downwardly whereby detent portion 220 engages the web of the channel of the succeeding rail anchor blank B and holds the same firmly over the final form horn during the final forming operation. It will thus be seen that there is preferably no independent transfer mechanism for removal of the completed rail anchor blank from the final form, the removal thereof being completed entirely by engagement thereof with the next succeeding rail anchor blank. However, it will be apparent that additional discharge mechanism could be employed to positively discharge the completed rail anchor from the final form horn, e.g. after a temporary stopping of the press or in the event an anchor is not followed by a succeeding anchor.

During the engagement of detent 220 with the web of the channel of the succeeding rail anchor blank, whereby said rail anchor is held firmly in position on the final form horn, certain final forming operations are performed on the anchor by actuation of a third form punch assembly. The third form punch assembly, referring to FIGS. 6, 7, and 8, comprises tapered actuating blocks 240 and 241 fixedly secured to the reciprocating ram 6 through a final form top die shoe 250, whereby actuating blocks 240 and 241 are adapted to reciprocate with reciprocating ram 6. The actuating blocks 240 and 241 are provided with punch opening cams 260 and 261, the punch opening cams being secured to the actuating blocks 240, 241 by bolt means, as shown at 263 and 264.

Positioned directly below the actuating blocks 240 and 241 are final form punch holders 244 and 245, the punch holders 244 and 245 being slidably mounted in punch holder slide members 247 and 248 mounted on the press frame.

Each of the sliding punch holders 244 and 245 have securely fastened thereto cam follower mounts 267 and 267', respectively, the latter being shown in FIG. 7. The cam follower mount 267, referring to FIG. 6, is secured to the sliding punch holder 244 by bolt means 269 and 270 and has mounted on the outer end thereof a cylindrical cam follower 272 which is rotatably mounted on said cam follower mount by pin means 273. Securely mounted on the lower portion of the cam follower mount 267 is a rectangularly shaped spring mounting bar 274. The bar 274 is provided in the outer end thereof with an opening 275 which receives spring means 276, said spring means 276 functioning in a manner to be hereinafter described.

It will thus be seen that as reciprocating ram member 6 moves downwardly the inclined surface of the actuating blocks 240 and 241 will engage the inclined surfaces of the sliding punch holder elements 244 and 245 moving the same forwardly in the punch holder slides 247 and 248. It should be noted that the punch opening cam 260 and cam follower mount 267 and cylindrical cam 272 are mounted on the ends of the actuating block 240 and sliding punch holder 244, respectively, so as to not interfere with the downward movement of actuating block 240. The cylindrical cam 272 is mounted in the same vertical plane as the punch opening cam 260.

As the inclined surface of the actuating block 240 contacts the inclined surface of the sliding punch holder 244 and slides the latter toward the final form horn, the punch opening cam 260 will correspondingly move down the inclined surface of sliding punch holder 244 and will eventually assume the position illustrated in FIG. 7.

As illustrated in FIG. 7, the actuating block 241 and punch holder 245 are provided with camming structure identical to that provided for the actuating block 240 and the punch holder 244 whereby specific referral thereto is deemed unnecessary.

The final form punch assembly includes a plurality of individual punch members which combine with the final form horn to provide the specific desired features of the completed rail anchor. The individual punch members include an overdrive punch 280 which upsets a portion of the curved loop to form a stop or protuberance on the completed anchor to prevent overdrive of said anchor onto the rail flange, a hook punch 294 which forms on the rail anchor a hooked end portion for hooking the anchor onto the rail flange, and a sizing punch 300 which functions to provide the C-shaped end of the rail anchor with the desired shape.

Referring now to the specific structure of the forming punches of the final form punch assembly, the overdrive punch 280 is secured to sliding punch holder 245 by means such as, e.g. bolts 281. The final form overdrive punch 280 is provided with a shoulder 283 which, when engaging the inside surface of the channel of the rail anchor blank, forms a projection thereon, as clearly shown in FIG. 7a. This projection functions in a manner more fully set forth in the above described U.S. Patent 3,102,690 and, generally, functions to prevent overdriving of the rail anchor during application thereof onto the rail flange.

Mounted on the lower portion of the sliding punch holder 245 is the final form hook punch 294, the hook punch being secured to the sliding punch holder 245 by bolt means 296. The final form hook punch 294 is provided with a projecting shoulder 298, which shoulder combines with the final form horn to provide a rail flange-engaging hook portion on the completed rail anchor.

The final form sizing punch 300 is secured to the sliding punch holder 244 by means of bolts 302. The sizing punch 300 is provided with a tapered shoulder portion 304 which, when the sliding punch holder 244 is moved forward in the above described manner, engages the bottom of the channel of the rail anchor blank and forces the same against the final form horn to provide the desired final shape of the C-shaped end portion of the rail anchor.

A final form stripper means 286 is seated in an opening in the sliding punch holder 245, said stripper 286 being provided with a spring-mounted pin element 288 which is adapted to reciprocate in an opening 289 in the stripper 286. The pin element 288 is normally held in the outwardly extending FIG. 6 position by means of a spring 290. However, when the anchor stripper 286 moves inwardly with the movement of the sliding punch holder 245, the outer end of the pin element 288 will engage the bottom of the channel of the rail anchor blank, whereby the pin element 288 will be forced inwardly relative to the casing of stripper 286, thereby compressing spring 290 seated therein. It will be apparent that when sliding punch holders 244 and 245 are moved away from the final form horn, in a manner to be described hereinbelow, the rail anchor blank B is stripped from the final form punches, whereby the rail anchor blank B is held freely suspended on the final form horn and maintains the shape formed thereat.

Referring now to the withdrawal of the final form punches from the final form horn, upon the completion of the forming cycle, said withdrawal is actuated by the upward movement of reciprocating ram 6, similar to the manner in which the forming punches at the first and second forming station are withdrawn from the forming dies. Referring to FIG. 7 it will be seen that when ram 6 moves upwardly, actuating blocks 240 and 241 move vertically upwardly, the adjacent surface of punch opening cam 260 will engage the surface of the cam cylinder 272, whereby continued upward movement of the actuating punch will cause the sliding punch holder 244 to be moved rearwardly.

It will be obvious that the sliding punch holder 245 mounted opposite from punch holder 244 will be withdrawn in a similar manner, and specific reference thereto is deemed unnecessary. Each of the elements of the cam follower mount 267' and the punch opening cam associated with the actuating punch 241 and sliding punch holder 245 are identical with their counterparts above described, and have been designated by the same reference character with an attached prime.

Figure 8:
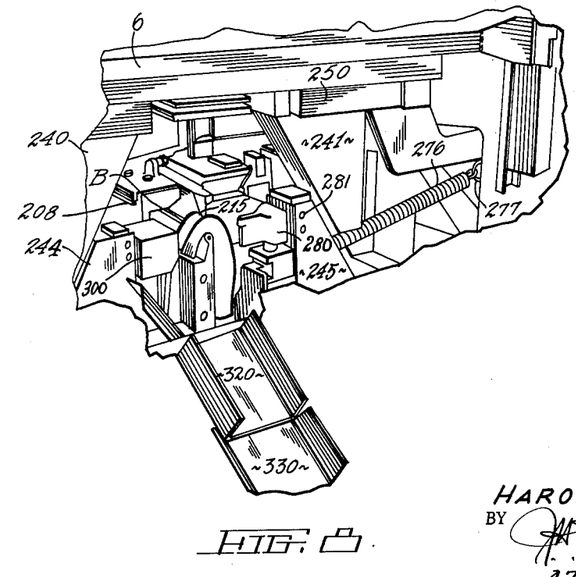
FIG. 8 is a rear elevational view of the machine, showing the final forming horn and punch structure means by which the completed rail anchor is dispensed from the final forming horn and the apparatus.

Referring now to FIGS. 6 and 8, the movement of the sliding punch holders 244 and 245 away from the final form horn is supplemented by the spring means 276, which is secured at one end to the bars 274, and functions through said bar member 274 to exert a spring pressure on the cam follower mount 267. The other end of the spring means 276 is mounted on a hook 277 fixedly mounted on the die press frame. Although only one spring is shown in FIG. 6, it will be obvious that an identical spring arrangement is provided on the opposite side, associated with sliding punch holder 245, to withdraw the same.

Referring now to FIG. 7, the final form assembly is shown in a position wherein the final form punches are shown approaching each other, forcing the rail anchor blank B interposed therebetween and suspended on the horn 210 around the said final form horn 210 ironing the same in final form. The final form overdrive punch 280 at such time is in engagement with the bottom of the channel of said rail anchor blank, the shoulder 283 of said overdrive punch forming a projection on said rail anchor blank for purposes described above. Similarly, the final form hook punch 294, when in a forward anchor-engaging position, engages the bottom of the channel of said rail anchor, the shoulder 298 of said hook punch 294 serving to form a hook end portion on said rail anchor blank B. The sizing punch 300, when in its forwardmost position, functions to force the relatively short, C-shaped loop end of the rail anchor blank around the final form horn into the desired final shape. In the FIG. 7 illustration, wherein the punches are in their final forming position, the detent 215 of the upper stop member 214 is shown as engaging the bottom of the channel of the rail anchor blank holding the same in place during the forming cycle. The final form horn 210 comprises a rounded, top portion 214, an inclined loop forming upper portion 216, and an inwardly offset lowermost portion 218 for the reception of the shoulder 298 of the punch 294. The final form horn 210, which is carried by the transfer horn or rail means 208, is secured to the same by means of bolts 209 which extend through aligned openings in both the horn 208 and the final form horn 210. The top, rounded portion 214 of the final form horn 210 is preferably provided with an opening 214a through which a source of pressurized air (not shown) can flow for the purpose of cooling the top portion 214 of the horn 210 which may have a tendency to heat due to the ironing thereon.

Referring now to FIG. 7a, there is therein shown a completed rail anchor. The completed rail anchor includes a downwardly bowed central portion B1, a hook-like end portion B2, an overdrive projection B3, and bearing pad portions B4 and B5. For a further detailed description and the method of application of the illustrated rail anchor, attention is drawn to the above mentioned U.S. Patent No. 3,102,690.

Referring now to FIG. 8, a view taken from the rear of the machine, the rail anchor blank B is shown positioned over the final form horn 210, immediately prior to the final forming thereof by the final form punch members. As noted above, there is preferably no independent transfer or discharge mechanism for removing the completed rail anchor blank from the final form horn. As above described, the completed rail anchor blank is dislodged and ejected from the final form horn by means of contact therewith by the next succeeding rail anchor being transferred to the final form horn. After the completed rail anchor is ejected from the final form horn it falls by gravity down chute 320 into chute 330 for subsequent handling.

The operation of the apparatus should be apparent from the above description but for purposes of clarity will be briefly re-described. The heated flat rail anchor blanks are fed from an appropriate heating source, e.g. a furnace, to the magazines 10, 10' by means of the inclined chute 14. The rail anchor blanks are then transferred, one at a time, preferably to a stamping station and then to the first forming station, whereat the forming die assembly forms the flat rail anchor blank into a generally channel-shaped blank having an irregular bottom surface. Subsequent to the forming of the rail anchor blank at the first forming station, said channel-shaped rail anchor blank is transferred to the second forming station, which comprises a second form horn and punch, whereat the rail anchor blank is formed into a substantially J-shaped, channeled anchor. The J-shaped rail anchor blank is then transferred to a final form horn whereat the final structural features are formed therein by a plurality of punches at the final forming station. The completed rail anchor is then ejected from the final form horn preferably by contact with the next succeeding rail anchor blank, and is discharged from the machine by means of a chute located in the rear thereof.

The actuation of the punch elements at each forming station and the actuation of the transfer mechanism are responsive to the movement of the reciprocating ram 6. The downward movement of ram 6 simultaneously actuates mechanism to perform the following: the final form horn punches close around the final form horn thus performing the final shaping of the completed rail anchor; the second forming punch simultaneously moves downwardly around the second form horn and transforms the next succeeding rail anchor blank into a generally J-shape; the first form punch simultaneously moves downwardly and forms a generally channel shape in the second succeeding blank; a stamping operation, if desired, is simultaneously performed on a third succeeding rail anchor blank; the transfer mechanisms above described, i.e., the transfer mechanism for transferring a rail anchor blank from the magazine to the first forming station, the transfer device for transferring the rail blank from the first station to the second station, and the transfer mechanism for transferring the rail anchor blank from the second station to the third station, are simultaneously actuated to a withdrawn position during the downward movement of reciprocating ram 6.

Upon the upward movement of reciprocating rams 6, the forming punches simultaneously move away from the forming dies and the transfer mechanisms are simultaneously moved to a blank-engaging position whereby the blanks are transferred to the next station to complete the cycle.

It will thus be seen that I have accomplished the objects of my invention. I have provided the apparatus for and the method of forming a one piece rail anchor completely automatically. I have further provided an apparatus for and a method of forming a rail anchor wherein the operation is continuous. I have further provided an apparatus for and a method of forming a rail anchor wherein the rail anchor does not have to be reheated during the forming operation. Still further, I have provided an apparatus for and a method of forming a one piece rail anchor that achieves a high degree of accuracy in maintaining prescribed dimensions on said rail anchor, the accuracy of product being of the utmost importance in the forming operation.

It will be understood that many departures from the details of this invention, as herein described and illustrated, may be made without, however, departing from the spirit thereof or the scope of the appended claims. For example, the forming punches and dies could be modified to accommodate rail anchor blanks of varying sizes. Further, the shape of the dies and punches could be changed to accommodate desired changes in the structure of the completed rail anchor.

What I claim is:

1. The method of forming a one piece rail anchor from a heated, flat metal blank by an automatic, continuous process comprising the steps of delivering said heated flat blank to a magazine, transferring said heated flat blank to a first die-forming station, forming said flat blank into a channel shape, transferring said channel-shaped blank to a second die forming station and onto a forming horn, forming said channel-shaped blank into a generally J-shape around said forming horn, transferring said J- shaped blank to a third die forming station onto a final forming horn, forming said blank into a final rail anchor form having a channeled cross section and a C-shaped end portion, and removing said completed rail anchor from said final forming horn.

2. Apparatus for automatically forming one piece rail anchors from flat metal blanks comprising, in combination, first, second, and third forming stations, each of said stations including a stationary die member and a movable die member cooperable therewith, transfer means to transfer said blanks to each succeeding station, whereby said flat metal blanks are sequentially formed into one piece, channel-shaped rail anchors.

3. Apparatus for continuously and automatically forming one piece rail anchors from flat metal blanks comprising a reciprocating ram means, forming means comprising a plurality of forming stations, said forming means being simultaneously actuated by said reciprocating ram means, means to transfer said rail anchor blanks to each of said stations, whereby said flat metal blanks upon the actuation of said ram means are formed at said stations into one piece, channel-shaped rail anchors.

4. The combination of claim 3 wherein one of said forming stations comprises a stationary and a movable die member functioning, when actuated by said ram means, to form said rail anchor blank into a channel shape having an irregular, bowed surface, and wherein said forming stations simultaneously act on different of said rail anchor blanks.

5. Apparatus for continuously and automatically forming one piece rail anchors from flat metal blanks comprising a reciprocating ram means, forming means comprising a plurality of forming stations, means to transfer said rail anchor blanks to each of said plurality of stations, said forming means and said transfer means being simultaneously actuated by said reciprocating ram means, whereby during one half of the cycle of movement of said reciprocating ram means, rail anchor blanks are positioned at each of said forming stations and simultaneously formed thereat, and during the remaining part of the cycle of said reciprocating ram means, said rail anchor blanks are simultaneously transferred to the next forming station.

6. Apparatus for automatically forming one piece rail anchors from metal blanks comprising, in combination, means to receive and temporarily hold said metal blanks, transfer means to transfer said blanks, one at a time, from said first means to a first forming station, said first forming station including a stationary member and a reciprocating member cooperable therewith for forming said blank into a predetermined shape, a second transfer means to transfer said blank from said first forming station to a second forming station, said second forming station including a stationary forming member and a reciprocating member cooperable therewith for further forming said rail anchor blank, a third transfer means for transferring said blank to a third forming station, said third forming station including a stationary member and a reciprocating member cooperable therewith for forming said blank into its final form.

7. Apparatus for automatically forming one piece rail anchors from flat metal blanks comprising, in combination, a plurality of die forming stations, the first of said plurality of die forming stations comprising a stationary bottom die defining a rectangular opening, a reciprocable die punch assembly comprising a loop punch and a hook punch, means to reciprocate said die punch assembly, whereby said flat blank is formed at said first forming station into a channel shape having an uneven bottom connecting wall, and transfer means to transfer said blanks to said stations.

8. The combination of claim 7 wherein said loop punch has an irregular bottom surface and said hook punch is generally rectangular in form and has a flat bottom surface, said hook punch being spaced from said loop punch.

9. Apparatus for automatically and continuously forming one piece rail anchors from metal blanks comprising, in combination, a plurality of die forming stations, one of said die forming stations comprising a stationary forming horn, a reciprocable die punch assembly movably mounted adjacent said forming horn, said die punch assembly comprising a plurality of die punches adapted to combine with said forming horn to form said blank into a predetermined shape, and transfer means to transfer said blanks to said stations.

10. The combination of claim 9 wherein said plurality of die punches provide blank-engaging surfaces complementing correspondingly shaped portions of said forming horn, whereby said blanks are ironed around said forming horn by said plurality of die punches.

11. The combination of claim 9 wherein said forming horn is provided with an opening in the upper portion thereof, said opening adapted to receive a cooling medium to thereby prevent said forming horn from overheating during the forming operation.

12. Apparatus for automatically forming one piece rail anchors from metal blanks comprising, in combination, first, second, and third forming stations, transfer means for transferring said blanks to said stations, said second and said third forming stations including a second and a third forming horn, respectively, said transfer means including a transfer member positioned between said second and said third forming horns, said transfer member having a contour substantially similar to each of said horns, wherefor each substantially J-shaped anchor piece formed at the second horn is advanced over the transfer member to the third form horn by said transfer means.

13. The combination of claim 12 wherein the upper portion of said transfer member is of slightly lesser dimension than the upper portions of said second and said third form horns.

14. Apparatus for automatically forming one piece rail anchors from flat metal blanks comprising, in combination, first, second, and third forming stations, said second and third forming stations including a forming horn, said third forming station further including a pivotably mounted stop member to releasably hold said blank on said third station forming horn, resilient means biasing said stop member into engagement with said blank positioned on said horn, transfer means interposed between said stations to transfer said blanks to each succeeding station, whereby when a blank is transferred from said second forming station to said third forming station, said blank engages said pivotably mounted stop member and pivots the same upwardly, said stop member thereby releasing said blank positioned over said third station forming horn, whereby said blank being transferred to said third forming station contacts said blank positioned on said third station forming horn and forces the same therefrom.

15. Apparatus for automatically forming one piece rail anchors from metal blanks comprising, in combination, first, second, and third forming stations, each of said stations including a stationary die member and a movable die member cooperable therewith, means to actuate said movable die member, transfer means for transferring said blanks to each succeeding station, a support means positioned between said first and said second forming stations to support said blank during transfer thereof to said second forming station, said support means including a pair of pivotably mounted blank supporting members and the second stationary die member, resilient means biasing said supporting members to a position supporting said blank whereby upon actuation of said second station movable die member by said actuating means, said supporting members are pivoted downwardly by said blank, thereby releasing that portion of the blank supported thereby.

16. The combination of claim 15 wherein said resiliently biased support means comprises a pair of pivotably mounted blank supporting shelf members, means to pivotably mount each of said shelf members, said pivot means being mounted on either side of the movable die receiving opening in said stationary die member.

17. Apparatus for automatically forming one piece rail anchors from metal blanks comprising, in combination, first, second, and third forming means, transfer means to transfer said blanks to said forming means, reciprocating ram means to simultaneously actuate said forming means, said third forming means including a forming horn, an actuating punch means secured to said ram means, a punch holder means adapted to be engageable with and moved by said actuating punch means, means slidably mounting said punch holder means, said punch holder means having a plurality of die forming punches mounted thereon, whereby downward movement of said ram means and the actuating punch means carried thereby slidably moves said punch holder means whereby said die forming punch means engage a blank positioned over said third forming horn and form the same around said forming horn, and means to move said punch holder means away from said forming horn.

18. The combination of claim 17 wherein said means to move said punch holder means away from said forming horn includes a cam means mounted on said actuating punch means and a cam cylinder means mounted on said punch holder means whereby upon upward movement of said actuating punch means, said cam means engages said cam cylinder means whereby said punch holder means is moved away from said forming horn.

19. The combination of claim 17 wherein said means to move said punch holder means away from said forming horn includes spring means connected to said punch holder means.

20. Apparatus for continuously and automatically forming one piece rail anchors from flat metal blanks comprising a magazine to receive and temporarily hold said blanks, first, second, and third forming stations, transfer means for transferring said blanks sequentially from said magazine to said first, second, and third forming stations, said transfer means for transferring said blanks from said magazine to said first station including a pusher plate, a pusher bar connected to and extending downwardly from said pusher plate, guide means adapted to support said blanks and to guide the said pusher plate positioned rearwardly of said blanks during the transfer movement, and actuating means associated with said pusher bar to reciprocate said pusher plate to transfer said blank to said first forming station.

21. The combination of claim 20 wherein said actuating means comprises a reciprocating ram, said pusher bar being connected to said ram through a linkage assembly having a lost motion connection to permit a predetermined amount of overtravel of said ram relative to said pusher plate.

References Cited by the Examiner
UNITED STATES PATENTS 1,371,288   3/21   Wolhaupter.
2,206,307   7/40   Schneider.

CHARLES W. LANHAM, *Primary Examiner.*